Jan. 31, 1950
H. L. HORWITZ
2,495,725
PULSE CORRECTING REPEATER
Filed June 18, 1945
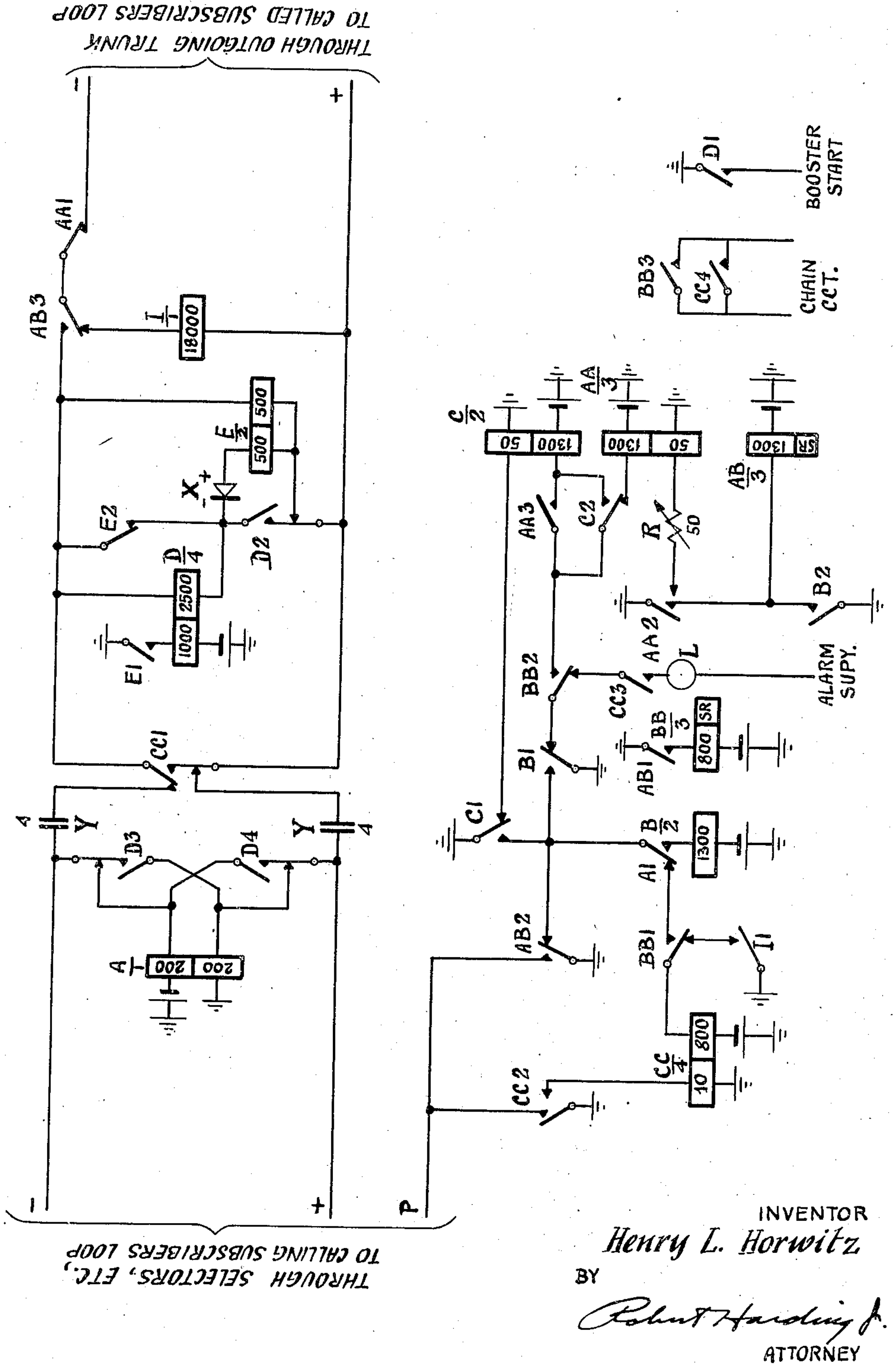
INVENTOR
*Henry L. Horwitz*
BY
Robert Harding Jr.
ATTORNEY Patented Jan. 31, 1950

2,495,725

UNITED STATES PATENT OFFICE 2,495,725

PULSE CORRECTING REPEATER

Henry L. Horwitz, Jamaica, N. Y., assignor to Federal Telephone and Radio Corporation, New York, N. Y., a corporation of Delaware Application June 18, 1945, Serial No. 599,984

6 Claims. (Cl. 179—16)

This invention relates to improvements in pulse correcting repeater, particularly to impulse repeaters for use in an automatic telephone system, and has for an object to provide in an impulse repeater an improved arrangement for correcting distorted impulses and for transmitting the corrected impulses regardless of the incoming impulse ratio.

Another object of the invention is to provide an improved impulse repeater adapted for regulating the outgoing impulse in accordance with the condition of the trunk to which the repeater is connected.

Still another object of the invention is to provide an improved impulse repeater adapted for transmitting more accurate outgoing impulses by reducing the impedance of the outgoing circuit during the transmission of impulses.

A further object of the invention is to provide an improved impulse repeater in which the quality of talking transmission therethrough may be increased.

A still further object of the invention is to provide a more reliable impulse repeater in which polarized relays have been eliminated.

Yet a further object of the invention is to provide in an impulse repeater a guard relay adapted for protecting a faulty trunk from intrusion.

With the above objects in view, one embodiment of the invention discloses an impulse repeater in which impulse correction is carried out by adjusting the open period of the outgoing impulse by a variable impedance, which is adjusted in accordance with the impedance of the connected trunk. Further impulse correction is carried out by disconnecting the blocking condensers from the impulsing circuit during the impulsing period, thereby permitting the use of higher capacity condensers with consequent improvement in talking transmission. The embodiment also discloses an improved reverse battery supervisory arrangement in which the usual relays with an associated rectifier are employed in place of the customary polarized relays. A guard relay, normally connected to the outgoing trunk, busies the impulse repeater in the event of a faulty trunk and at the same time operates an alarm for the maintenance personnel.

A more complete understanding of the invention will be obtained from the following description of a preferred embodiment thereof, taken in conjunction with the accompanying drawing in which a circuit arrangement of an impulse repeater is interposed between a calling subscriber's loop and an outgoing trunk to a called subscriber's loop of an automatic telephone system.

Referring now to the drawing, there is shown an impulse repeater connected at the left, as viewed in the drawing, through suitable switches (not shown), such as selectors, to a calling subscriber's loop and at the right to an outgoing trunk which is connected in a manner well known in automatic telephone practice to a called subscriber. Before proceeding with a description of the circuit, however, the manner of illustrating the relays and associated contacts on the drawing will be first explained. It will be observed that each relay is identified by a letter character with a horizontal bar underneath the character and a numeral. The lettered character indicates the designation of the relay, while the numeral thereunder indicates the number of contacts associated with the particular relay. For example, relay $$\frac{A}{1}$$

indicates a relay having one contact, which is designated A1, while relay $$\frac{D}{4}$$

indicates a relay having four contacts, which are designated D1, D2, D3, and D4. The contacts are, as illustrated, disposed in the circuit in a manner to shorten the leads interconnecting the component elements of the circuit.

With respect to a general description of the principal elements of the impulse repeater, the A relay, which may be termed a line relay, is shown connected to a calling subscriber's loop and is accordingly responsive to digital impulses transmitted by the subscriber operating his dial (not shown). Relay AA is an impulse repeating relay, contact AA1 of which intermittently opens the outgoing trunk circuit in accordance with the impulses received by relay A. Relay AA is controlled by relays B and C and is adapted to be slow released through an auxiliary shunt winding having an adjustable impedance R, which is adjusted in accordance with the impedance of the outgoing trunk to which it is normally connected. Thus, by carying the impedance R, the open period of the outgoing impulse may be accordingly varied to meet the conditions of the trunk to which it is connected. Relay B is an impulse locking relay which is controlled by relays A and C, while slow release relay BB is controlled by an auxiliary slow release relay AB. Relay C is an interlocking slow operate relay made so by its shunted auxiliary winding.

Relay CC is an impulsing control and release guard relay controlled by relays A and I. Relay CC is also made slow release through its 10 ohm winding. Relay D is a battery feed reversing relay and forms a part of the talking bridge in conjunction with called subscriber's supervisory relay E, which with a suitable asymmetric resistance, such as a dry-disc rectifier X, and its series opposed balanced windings replaces the customary polarized relay. Trunk line guard relay I is a high impedance relay, normally connected across the outgoing trunk, and in the event of a fault on the trunk releases to operate the release guard relay CC, which in turn grounds the test lead P of the selector connected to the calling subscriber's loop, closes a common alarm circuit including lamp L for the maintenance personnel, and closes a chain relay circuit. A portion of the chain circuit is shown in which a signal (not shown) is rendered effective when all trunks in a group are busy. Blocking condensers Y, which are provided in the + and — conductors, are disconnected from the outgoing impulsing circuit before the first impulse and during the transmission of the subsequent impulses. Since the condensers are ineffective during the impulsing period, a larger capacitance may be employed for them, thereby increasing the quality of talking transmission over this repeater.

The invention will be more readily understood from a detailed description of the operation.

Assuming a call to have been originated at a subscriber's station (not shown), a circuit is closed upon removal of the receiver (not shown), which energizes the line relay A in a circuit that can be traced from grounded battery through upper winding of relay A, non-operated break contact of relay D3, over — conductor, through conventional switches and calling subscriber's loop (not shown), back over + conductor, and thence through non-operated break contact D4 to ground via lower winding of relay A. Relay A operates and energizes impulse locking relay B in a circuit that can be traced from grounded battery, through winding thereof, and thence through operated contact A1 to ground via non-operated contact AB2. Relay B in operating provides an obvious locking circuit for itself over operated contact B1, while operated contact B2 provides an obvious energizing circuit for auxiliary release relay AB. Relay AB in operating, at its contact AB1 energizes slow release relay BB in an obvious circuit; at contact AB2 grounds the test lead P and removes ground from the above traced original operating circuit for relay B; and contact AB3 disconnects the line guard relay I and completes a circuit through the outgoing trunk to the called subscriber's loop, thereby seizing the switch ahead. Relay BB in operating, at contact BB1 prepares an operating circuit for relay CC and opens a ground circuit therefor via contact I1; at contact BB2 opens a circuit for alarm lamp L and at the same time prepares a circuit for impulse repeating relay AA; and at contact BB3 closes a chain circuit.

The subscriber now operates his dial (not shown) and intermittently interrupts the calling loop circuit, impulse relay A releasing in accordance with the interruptions, in the well-known manner. At the first release of relay A, contact A1 retracts and closes a momentary operating circuit for impulsing control relay CC. This circuit may be traced from grounded battery through right winding of relay CC, operated contact BB1, retracted contact A1, and to ground through operated contact B1 before relay B releases. Relay CC operates and at contact CC1 disconnects the calling subscriber's loop including the condensers Y from the outgoing trunk conductors —, +, thereby preparing a direct loop towards the called subscriber for impulsing purposes, and shunts the impedance bridge relay E. It is readily apparent that by disconnecting the condensers Y from the outgoing trunk circuit that impulse distortion is substantially eliminated. At contact CC2 and P conductor is grounded, which at this time performs no function in view of the ground provided by operated contact AB2, and also shunts the 10 ohm winding of relay CC, which is accordingly made slow release. Contact CC3 prepares a circuit for the alarm lamp L and contact CC4 closes chain circuit in parallel with operated contact BB3.

Upon retraction of contact A1, relay B releases and completes an operating circuit for impulse repeating relay AA in a circuit that can be traced from ground, through retracted contact B1, operated contact BB2, non-operated contact C2, through upper winding of relay AA to grounded battery. Relay AA in operating, at contact AA1 opens the outgoing trunk circuit; at contact AA2 connects ground to the auxiliary winding of relay AA and also to relay AB; and at contact AA3 closes an energizing circuit for relay C. Relay AB, being of a slow release type, does not immediately release upon retraction of contact B2 and is locked to ground over operated contact AA2. Relay C does not immediately operate in view of the 50 ohm grounded shunt circuit through non-operated contact C1 and while this retardation in the operation of relay C takes place, impulse repeating relay AA becomes saturated. However, upon operation of relay C, contact C1 disconnects the shunt winding for relay C and contact C2 opens the energizing circuit for relay AA. Relay AA does not immediately release because of its shunted auxiliary winding, which may be traced from ground, through its 50 ohm winding, adjustable impedance R, and operated contact AA2 to ground. It is to be noted at this point that the adjustment of impedance R is dependent upon the condition or impedance of the outgoing trunk to which the impulse repeater is connected. Thus, the time of release of relay AA is determined by the amount of impedance connected to its shunt winding and is independent of the time ratio of the incoming impulse of relay A. Therefore, the open circuit condition presented to the outgoing trunk may be accurately predetermined regardless of the impedance ratio presented by the incoming pulse.

After a predetermined interval of time, based on the inserted value of impedance R, relay AA releases and contact AA1 re-closes the outgoing trunk; contact AA2 removes ground from the lower winding of relay AA and also from relay AB; while contact AA3 in retracting performs no function, inasmuch as contact C2 provides a parallel connection for continued operation of relay C. Line relay A re-operates, or has already re-operated over the calling subscriber's loop and contact A1 or contact C1, whichever is operated last, completes the circuit for relay B again. Upon operation of relay B, ground is removed by operated contact B1 from the lower winding of relay C, which releases. Relay AB in view of its slow release characteristic does not immediately release upon the retraction of contact AA2, being re-energized over operated contact B2 of relay B. The above cycle of operation will be repeated for each interruption of the calling subscriber's loop until all digits have been dialed, slow release relay CC remaining operated during vibration of contact A1.

It is thus apparent that the corrected impulses transmitted by the impulse repeating relay AA may be of different characteristics as compared with those received, the duration of each repeated impulse being determined by the impedance of the outgoing trunk and, in turn, by the adjustable releasing interval of repeating relay AA. It is further apparent that a more efficient impulse transmitting circuit is provided by shunting the impedance bridge and by eliminating the talking transmission condensers Y during the impulsing period.

Upon cessation of dialing by the calling party, line relay A remains steadily operated and the energizing circuit for relay CC is opened by operated contact A1, whereby relay CC restores, contact CC1 retracting to remove the shunt circuit across the impedance bridge of relay E and to close the talking circuit through the condensers Y. Contacts CC2, CC3, and CC4 retract but perform no useful function at this time. While the supervisory relay E is connected across the outgoing trunk, it cannot operate as the current flow through its balanced windings is equal and opposite in direction, so that the magnetic flux therethrough is cancelled. This is readily apparent by tracing the circuit from the outgoing trunk loop over the — conductor through non-operated contact AA1, operated contact AB3, and thence in parallel paths, one path being routed through the right winding of relay E, the other path being routed via non-operated contact E2 through rectifier X, which is poled to permit negative current therethrough from left to right, thence through the left winding of supervisory relay E to join the other path, and finally through non-operated break contact D2 to the outgoing trunk loop over the + conductor. While a dry rectifier X is preferably employed, it is, of course, understood that any suitable asymmetric device may be used.

Upon the called party answering, the called party's battery feed relay (not shown) operates and reverses the current over the +, — conductors of the outgoing trunk. Owing to the reversal of polarity at the rectifier X, no current is permitted to flow through the rectifier X nor through the left winding of the supervisory relay E. However, current will flow through the right winding of the supervisory relay E and will cause operation thereof in a circuit already traced. Relay E operates and upon closure of contact E1 energizes battery feed reversing relay D in an obvious circuit, while contact E2 opens a shunt circuit across the 2500 ohm winding of relay D. Relay D in operating, at contact D1 connects ground to the booster start circuit; at contact D2 opens the break contact thereunder and places the two windings of the supervisory relay E in series; with the result that the impedance bridge across the outgoing trunk now comprises a circuit than can be traced from — conductor (+ potential), non-operated contact AA1, operated contact AB3, and thence in parallel, one path being traced serially through the two windings of supervisory relay E and rectifier X, the other path being traced through the 2500 ohm winding of relay D, both paths converging at operated contact D2, through which the circuit may be traced to the other side of the outgoing trunk over the + conductor (— potential). Contacts D3 and D4 reverse battery and ground to the calling subscriber's loop.

Conversation now takes place between the calling and the called parties, at the conclusion of which one of the parties replaces his receiver on its mounting. Assuming that the called party first replaces the receiver, current in the outgoing trunk loop will reverse and revert to its original polarity, as shown on the drawing. Relay E releases because of the rectifier X, which is so poled as to block current through the two windings of relay E. Trunk line current, however, still continues to flow through the 2500 ohm impedance bridge winding of relay D and thus maintains this relay in an operated condition. Relay E in releasing, at contact E1 opens the operating winding for relay D, and at contact E2 shunts the impedance bridge (2500 ohm) winding of relay D and thereby causes this relay to release. Relay D in releasing, at contact D1 removes ground from the booster start circuit, at contact D2 performs no useful function at this moment, and at contacts D3 and D4 restores the original battery and ground polarity to the calling subscriber's loop for supervisory purposes.

After the calling subscriber restores his receiver to the hand set, the calling loop is opened and line relay A releases, breaking at contact A1 the circuit for relay B, which releases, contact B2 of which breaks the energizing circuit for relay AB. Contact B1 in retracting energizes line repeating relay AA in a circuit hereinbefore traced. Relay C then operates and finally relay AA releases after its predetermined interval in the manner described hereinbefore. However, the pulse delivered by repeating relay AA, namely, through operation of contact AA1, at this time is of no effect upon the outgoing trunk circuit since the release relay (not shown) of the final selector thereof will not release.

Auxiliary release relay AB in releasing, opens the forward loop over the outgoing trunk at contact AB3, releasing all switches ahead, and closes an energizing circuit for relay I. Contact AB2 removes the release trunk ground from test lead P which, however, is still guarded by relay CC, which operated in a circuit already traced upon retraction of contact A1. Contact AB1 in retracting opens the operating circuit of release relay BB, contact BB1 thereof opening the operating circuit for relay CC, contact BB2 preparing a circuit for the alarm lamp L, and contact BB3 opening the chain circuit. Relay CC now releases, contact CC1 thereof re-establishing a talking transmission circuit, contact CC2 removing release trunk ground from the test lead P, contact CC3 opening the alarm supervisory circuit for lamp L, and contact CC4 opening the chain relay circuit. The impulse repeater is now in a condition to be employed for further traffic. In the event that the calling party had first replaced his receiver, it is, of course, understood that relay E would release upon contact AB3 retracting and that relay D would follow the release of relay E in the manner already described.

Should a fault, such as an open, short, or ground, be connected to the outgoing trunk line of an idle impulsing repeater of the disclosed embodiment, relay I would release and complete at contact I1 a circuit for relay CC, which may be traced from ground, through retracted contact I1, non-operated contact BB1, and thence through the 800 ohm winding of relay CC to grounded battery. Contact CC1 disconnects the talking condensers Y, contact CC2 grounds the test conductor P of the release trunk, thereby guarding against intrusion, and contact CC4 closes the chain relay circuit. Contact CC3 closes an operating circuit for the alarm lamp L, which may be traced from ground, through retracted contacts B1, BB2, operated contact CC3, alarm lamp L, and thence through the alarm supervisory circuit to grounded battery (not shown). Energization of alarm lamp L provides a visual warning to the maintenance attendant, who takes the necessary steps to clear the trouble on the trunk line in the usual manner, after which the circuit is restored to its normal condition with relay I operating and relay CC and lamp L de-energizing.

While this invention has been shown and described in accordance with the preferred embodiment merely for the purpose of illustration, it is, of course, understood that various modifications may be made and that the features thereof may be applied to many other fields without departing from the scope of the invention, as defined in the appended claims.

What is claimed is:

1. In a signaling system, an impulse repeater interposed between an incoming and an outgoing line for repeating direct current impulses impressed upon said incoming line and for passing supervisory signals in the talking circuit upon termination of the pulsing period, said repeater comprising a pair of talking conductors interconnecting said lines, a source of direct current for each of said lines, a blocking condenser disposed in each of said conductors for confining said direct currents to the respective incoming and outgoing lines, an impedance bridge including a relay with balanced windings disposed across the conductors connected to the outgoing line for passing the supervisory signals, and means for connecting said windings either in parallel or in series depending on the polarity of the current of said outgoing line.

2. In a signaling system, an impulse repeater interposed between an incoming and an outgoing line for repeating direct current impulses impressed upon said incoming line and for passing supervisory signals in the talking circuit upon the termination of the pulsing period, said repeater comprising a pair of talking conductors interconnecting said lines, a source of direct current for each of said lines, a blocking condenser disposed in each of said conductors for confining said direct currents to the respective incoming and outgoing lines, an impedance bridge including a relay with balanced windings disposed across the conductors connected to the outgoing line, asymmetric means connected to one of said balanced windings for poling current through said impedance bridge, means under control of said relay for connecting said windings either in parallel or in series depending on the polarity of the current of said outgoing line, said relay being so poled by said asymmetric means as to be effective only while the direct current in said outgoing line is reversed.

3. In a signaling system, an impulse repeater interposed between an incoming and an outgoing line for repeating direct current impulses impressed upon said incoming line and for repeating supervisory signals in the talking circuit upon termination of the pulsing period, said repeater comprising a pair of talking conductors interconnecting said lines, a source of direct current for each of said lines, a blocking condenser disposed in each of said conductors for confining said direct currents to the respective incoming and outgoing lines, an impedance bridge including a relay with opposed balanced windings disposed across the conductors connected to the outgoing line for receiving supervisory signals from the outgoing line, and means for connecting said windings either in parallel or in series depending on the polarity of the current of said outgoing line, said means including a rectifier connected to one of said windings for poling current through said impedance bridge and an additional relay means under control of said first-named relay, whereby said impedance bridge is effective only while the direct current in said outgoing line is reversed.

4. In an automatic telephone system, an impulse repeater interconnecting an incoming and outgoing trunk comprising, in combination, a line relay responsive to impulses received from said incoming trunk, an impulse repeating relay for repeating said impulses to said outgoing trunk, a line guard relay connected to said outgoing trunk for preventing seizure thereof in the event of a fault thereon, an impedance bridge including a relay with balanced windings for repeating supervisory signals from said trunk, means including said impulse repeating relay for retransmitting said received impulses, adjustable impedance means associated with said repeating relay for correcting said received impulses in accordance with the impedance of the outgoing trunk, means for disconnecting the incoming trunk from the outgoing trunk during the pulsing period, and means for connecting said windings either in parallel or in series depending on the polarity of the current of said outgoing line.

5. In an automatic telephone system, an impulse repeater adapted for repeating dial impulses from an incoming line to an outgoing line and for repeating supervisory signals in the talking circuit upon termination of the pulsing period comprising, in combination, capacitance serially interposed between said lines, a line relay responsive to said dial impulses, a line guard relay bridged across said outgoing line for preventing seizure thereof in the event of a fault thereon, an impulsing control relay responsive to said line relay for disconnecting the capacitance from the outgoing line during the pulsing period, an impulse relay responsive to said line relay for repeating the received impulses to said outgoing line, an adjustable impedance for controlling the operating period of said impulse repeating relay, said impedance being set at a predetermined value in accordance with the impedance of the outgoing line, an impedance bridge connected across said repeater for supervisory purposes, and an asymmetric resistance associated with said impedance bridge for rendering said bridge effective upon the reversal of current in the outgoing line and release of said impulsing control relay.

6. In an automatic telephone system, an impulse repeater adapted for repeating dial impulses from an incoming line to an outgoing line and for repeating supervisory signals from one line to the other after the cessation of dialing comprising, in combination, a pair of condensers interposed between said lines, a line relay responsive to said dial impulses, a line guard relay bridged across said outgoing line for preventing seizure thereof in the event of a fault thereon, an impulsing control relay responsive to said line relay for disconnecting the condensers and the incoming line from the outgoing line during the pulsing period, an impulse relay responsive to said line relay for repeating the received impulses to said outgoing line, an adjustable impedance for controlling the release of said impulse repeating relay, said impedance being set at a predetermined value in accordance with the condition of the outgoing line, an impedance bridge including a relay having two balanced windings connected across the output of said repeater for supervisory purposes, and a rectifier associated with said impedance bridge for rendering said bridge effective upon the reversal of current in the outgoing line and the release of said impulse control relay.

HENRY L. HORWITZ.

REFERENCES CITED

The following references are of record in the file of this patent:

UNITED STATES PATENTS

| Number | Name | Date |
|---|---|---|
| 1,726,759 | Ostline | Sept. 3, 1929 |
| 1,885,650 | Taylor | Nov. 1, 1932 |
| 1,906,338 | Saville | May 2, 1933 |
| 2,061,802 | Kroll et al. | Nov. 24, 1936 |
| 2,277,586 | Gray | Mar. 24, 1942 |
| 2,358,145 | Christian | Sept. 12, 1944 |

FOREIGN PATENTS

| Number | Country | Date |
|---|---|---|
| 482,014 | Great Britain | Mar. 22, 1938 |